United States Patent [19]

Murata et al.

[11] Patent Number: 5,091,201
[45] Date of Patent: Feb. 25, 1992

[54] PROCESS FOR MANUFACTURING MOLDED FOOD

[75] Inventors: Susumu Murata; Naomi Matsuo; Masako Sano, all of Osaka, Japan

[73] Assignee: Kanebo, Ltd., Tokyo, Japan

[21] Appl. No.: 692,966

[22] Filed: Apr. 29, 1991

Related U.S. Application Data

[63] Continuation of Ser. No. 353,269, May 17, 1989, abandoned.

[51] Int. Cl.$^5$ .................................................. A23L 1/00
[52] U.S. Cl. .................................... 426/285; 426/453; 426/512; 426/661
[58] Field of Search ................ 426/93, 285, 453, 512, 426/661

[56] References Cited

U.S. PATENT DOCUMENTS 4,332,832 6/1982 Buckley et al. .................... 426/661
4,585,657 4/1986 Karwowski et al. ............... 426/661

FOREIGN PATENT DOCUMENTS 1085107 9/1980 Canada .
53-54593 5/1978 Japan .
58-98045 6/1983 Japan .
63-112954 5/1989 Japan .
1543750 4/1979 United Kingdom .

Primary Examiner—George Yeung
Attorney, Agent, or Firm—Armstrong, Nikaido, Marmelstein, Kubovcik & Murray

[57] ABSTRACT

The present invention relates to a process for producing molded food which particles of processed food such as corn flakes, wheat flakes are binded with pregelatinized cereal powder containing aqueous ethyl alcohol or powdery polymer material to mold them in a shape such as thin and long plate and the like. In the case that molded food is made by binding said particles of processed food, conventionally corn syrup is used as a binder. In this case, the taste of corn syrup obstructs original taste of the processed food and besides obtained molded food is hard to be unpleasant when chewing since the processed food is binded strongly. In this invention, the particles of processed food are made wet previously, then they are sprinkled with pregelatinized cereal powder, dried with heating to bind the particles of processed food by making the pregelatinized cereal powder become a binder to obtain molded food. Thereby, the molded food which is binded processed food with the pregelatinized cereal powder not to crumble and which has soft and pleasant feeling when chewing is obtained. At the same time the original taste of the processed food remains since the pregelatinized cereal powder has no taste.

5 Claims, 1 Drawing Sheet

PROCESS FOR MANUFACTURING MOLDED FOOD

This application is a continuation of application Ser. No. 353,269 filed May 17, 1989 now abanndoned.

TECHNICAL FIELD

This invention relates to a process for manufacturing molded food which is formed in a shape like a thin and long plate or stick by adhering granular or chipped processed food such as wheat flakes.

PRIOR ART

Generally molded food molded with a binder such as corn syrup and the like in a shape of a rectangular parallelipiped by drying after steaming cereals such as millet has been so far familiar with as a confection or snack.

As typical examples of this molded food, there are confections called Awaokoshi in Japanese (millet confection), a granola bar and the like. There has been molded food which is formed by drying to puff (120° C., 30 min.) after molding under pressure by putting wheat flakes into a mold and then binding utilizing the puffing characteristics in wheat flakes. However, a product such as millet confection and a granola bar which is produced by adhering with a binder such as sugar or corn syrup as mentioned above causes a defect that it is hard and unpleasant when chewing. Furthermore, it causes a defect that taste of raw material itself does not remain because a large amount of a binder such as sugar or corn syrup is used to thereby add bad smell and sweet taste to the molded food.

The molded food which is formed by drying to puff (120° C., 30 min.) after molding under pressure by putting wheat flakes into a mold is binded by utilizing puffing characteristics in wheat flakes in drying to puff, and since it is not used a binder at all, bindability between flake particles is bad. It causes a big problem that the particles around the chewed part fall off to dirty floor and the like when chewing at to eat.

Accordingly, it is an object of the invention to provide a process for producing molded food wherein molded food of which the taste of raw material itself remains and the binded condition of the particles of processed food is good is produced. According to the present invention, the molded food of which the taste of raw material remains and the binding of the particles of processed food is made tightly can be obtained.

DISCLOSURE OF THE INVENTION

To accomplish the above-mentioned object, the present invention provides a process for producing molded food comprising steps of making granular or chipped processed food wet by adding water, sprinkling said wet processed food with pregelatinized cereal powder containing aqueous ethyl alcohol, molding said sprinkled granular or chipped processed food into a predetermined shape by putting them in mold and drying.

That is, the inventors conceived an idea that it was important to use a small amount of binder which has not sweet taste, strange taste and smell, and does not deteriorate the pleasantness to tongue in order to obtain molded food of which the taste of material itself remains, and made a series of research. As a result, the inventors found out that when the pregelatinized cereal powder is used as a binder, comparatively good effect can be obtained, they found out that an expected effect is obtained when pregelatinized cereal powder is treated to contain aqueous ethyl alcohol, it is mixed with wet processed food obtained by adding water, the mixture is put in a mold to make a predetermined shape and then dried, and completed the present invention. The taste of the material can thereby remain and a binding condition of the processed food each other can be improved. That is, the pregelatinized cereal powder is adhered around particles of processed food homogeniously and becomes glutinous state in that state, so that the processed food is binded tightly each other. Since the pregelatinized cereal powder itself has no taste and smell, the original taste of the processed food remains. However, there is a problem that the obtained molded food contains parts (spots) consisting of lumps ("dama" in Japanese) of pregelatinized cereal powder in the case that the molded food is actually mass-produced by applying this method. This causes because said pregelatinized cereal powder containing aqueous ethyl alcohol once adhered to the particles of processed food drops off from the particles with the progress of mixing and the dropped pregelatinized cereal powder is binded each other to be in a lump-form when wet partilces of processed food are sprinkled with pregelatinized cereal powder. And since the lumps become a component of the composition, once a phenomenon as mentioned above happened, the obtained molded food has a bad appearance and because of having parts consisting of lumps of the pregelatinized cereal powder.

The inventors were confronted with such a phenomenon and made further reseaches. As a result, they found out that the pregelatinized cereal powder does not part from the particles of processed food when saccharide is adhered in a powdery or solution form to the particles before making them wet, and therefore, a phenomenon that the pregelatinized cereal powder each other becomes in a lump-form is not caused to give the molded food in a good condition.

By research of the inventors after that, it is also known clearly that almost the same binding effect is obtained in the case that powder of polymer material such as pullulan, agar-agar, dextrin, gummy matter, alginic acid, sodium alginic acid, carboxy methyl-cellulose, caramel, gelatine, egg white, gluten and the like are used alone or blended instead of said pregelatinized cereal powder containing aqueous ethyl alcohol. In this case, when saccharide is adhered in a powdery or solution form to the particles of processed food before making them wet, separation of powder of polymer material from said particles of processed ford and becoming in a lump state by binding said powder of polymer material each other are prevented to give a molded food in a good condition.

In the present invention, as a binder, pregelatinized cereal powder containing aqueous ethyl alcohol and powdery polymer material are used. As said pregelatinized cereal powder, there are gelatinized materials of the followings, nonglutinous rice powder, glutinous rice powder, waxy corn starch, potato starch, wheat starch, corn starch and tapioca starch. These may be used alone or blended. As said powdery polymer material, there are poly-saccharaide such as pullulan, agar-agar, dextrin, gummy matter, alginic acid, sodium alginic acid, carboxy methyl-cellulose, caramel and the like and protein powder such as gelatine, egg white, gluten and the like. These may be also used alone or blended.

The particle size of these binder is normally used at 10 mesh pass in the light of their bindability. These are used in the range of 5~20 parts by weight per 100 parts by weight of particles of processed food in the light of a balance between their bindability and their taste. 85 vol % of ethyl alcohol is preferably used as aqueous ethyl alcohol contained in said pregelatinized cereal powder. In this case, the water content of aqueous ethyl alcohol influences to a bindability of pregelatinized cereal powder. The water content in the range of 2~40 vol % is preferable.

As particles of processed food which are a main component of the molded food according to the present invention, there are corn flakes, wheat flakes, instant noodle chips, nuts, dried vegetables, dried processed vegetables, dried fruits, dried processed fruits, dried meat, dried processed meat, dried fishes, dried processed fishes and confections and the like. As said confections, there are candies, puffed confections such as popcorn, chewing gum, baked confections, bean confections, processed chocolate such as chocolate chips, and they are used alone or blended. In the present invention, a large amount of one kind selected from above-mentioned particles of processed food is used as a main component and a small amount of another kind as a subcomponent is added and dispersed therein.

General producing method of this invention comprises adding water to granular or chipped processed food to make it wet, sprinkling the wet processed food with pregelatinized cereal powder containing aqueous ethyl alcohol, putting it in a mold and drying to mold it into a predetermined shape. In the case that many lumps of the pregelatinized cereal powder are produced, saccharide is adhered to the particles of the processed food before making said particles wet in order to prevent it. As saccharide which is adhered to the particles of processed food before making them wet, there are sugar soft sugar, granulated sugar), powdered corn syrup, glucose, fructose, and maltose, and they are used alone or blended. These saccharides are normally used in a powdery form, but it may be used in a solution form by adding water. From a view of preventing a binder of pregelatinized cereal powder from becoming in a lump state, sugar is preferably used as saccaharide. But if a large amount of these saccharides is used, the taste of the particles of processed food themselves is deteriorated. Therefore, it is set in the range of 2~40 parts by weight (in the case of liquid form saccharide such as corn syrup, it is set on the basis of solid part) per 100 parts by weight of particles of processed food.

In the present invention, the molded food is, for example, produced using above-mentioned materials as follows. At first, aqueous ethyl alcohol is added to pregelatinized cereal powder such as kambaiko in Japanese (powder of gelatinized glutinous rice) and mixed to give pregelatinized cereral powder containing aquous ethyl alcohol. On the other hand, the particles of processed food such as corn flakes, wheat flakes and the like are mixed with pouring water to make them in a wet condition. Thus the required state which said pregelatinized cereal powder is adhered to whole of the particles of processed food uniformly and it is hard for the particles to part is prepared. Then said pregelatinized cereal powder is added to the wet particles of processed food and mixed sufficiently to sprinkle the particles of processed food with said pregelatinized cereal powder. The reason why aqueous ethyl alcohol is contained into the pregelatinized cereal powder is because the kambaiko absorbs water rapidly to be in a glutinous state when only water is added to the kambaiko. The kambaiko does not bind in such a state. On the contrary, when aqueous ethyl alcohol is used, becoming in a glutinous state of the kambaiko rapidly is prevented by the action of alcohol and good binding action is given. To describe in detail, since water is contained in aqueous ethyl alcohol, when the aqueous ethyl alcohol is soaked into the kambaiko, alcohol and water are soaked into the kambaiko. As a result, the glutinous state of kambaiko is not caused by water contained in the aqueous ethyl alcohol while alcohol exists, but caused by water left after evaporating alcohol. Therefore, such kambaiko containing aqueous ethyl alcohol is mixed with said particles of processed food in a wet condition, the mixture is molded and then dried to thereby evaporate alcohol in aqueous ethyl alcohol and leave water in the kambaiko. Consequently the kambaiko becomes in a glutinous state, so that said particles of processed food are binded well. In this case, the glutinous state of kambaiko is not caused at the step of molding but caused at the step of drying. In the step, the kambaiko is mixed with said particles of processed food in a wet condition uniformly, and a binding action is given in the state. Therefore, a fine binding effect is obtained with a small amount of kambaiko.

Generally said molding is done by a molding machine. At this time, it is preferable that the molding is done by compression molding and said particles of processed food themselves are adhered closely with pregelatinized cereal powder containing aqueous ethyl alcohol. Drying after molding is done in a state that said particles of processed food are in a mold or they are taken out of a mold. In this case, drying by hot air is normally done, but when the particles of processed food which are melted and deformed by heat are used, ventilation drying or natural drying is applied.

In thus obtained molded food, the taste of its raw material remains since pregelatinized cereal powder without strange taste and smell is used as a binder. When eating, the particles of processed food are not crumbled since they are binded tightly each other by a binding action which said pregelatinized cereal powder provides.

In the case that the pregelatinized cereal powder binds to become a "dama" during manufacturing, saccharide such as powdery sugar and the like is added to the particles of processed food and mixed to be adhered with the particles before making them wet by adding water as afore-mentioned. Thus, said pregelatinized cereal powder which once adhered to the particles of processed food in sprinkling process does not part from the particles. Therefore a phenomenon the parted pregelatinized cereal powder is binded each other to be in a lump form with the progress of mixing with sprinkling does not occur. Therefore, the deterioration of appearance and taste of the product does not occur.

In the above manufacturing process, powdered pregelatinized cereals containing the aqueous ethyl alcohol is used as a binder. The powdered polymer material mentioned above may be used instead of this since the same effect is obtained. In this case, since the above powdered polymer material does not become in a glutinous state like powdered pregelatinized cereals, it does not require aqueous ethyl alcohol. Flakes and the like are used as the particles of processed food in the above process. But the use of instant noodle chips as the main material is effective. That is, in this case, the pregelatinized cereal powder as a binder fastly dissolves and noodle chips separate in a moment with mere pouring boiling water to the molded food. Thereby, the above noodle chips can be eaten in a condition that they are puffed and softened with hot water similarly to ordinary instant noodle.

According to the present invention, as mentioned above, molded food of which the taste of raw material itself remains without deteriorating the taste and the processed food is binded tightly each other not to crumble the particles of the processed food when eating can be obtained. Especially when adhering particles of processed food with powdery sugar is conducted prior to adding water to the particles to be in a wet condition, a phenomenon which pregelatinized cereal powder having aqueous ethyl alcohol used as a binder binds each other in manufacturing process to become in a lump form and the lumps are contained in the molded food to form spots does not occur. Therefore, the molded food of which the appearance is good and the taste is not deteriorated by the lumps of the binder, pregelatinized cereal powder can be obtained.

PREFERABLE EMBODIMENTS

Next, the present invention is explained based on Examples.

EXAMPLE 1

Figure 1:
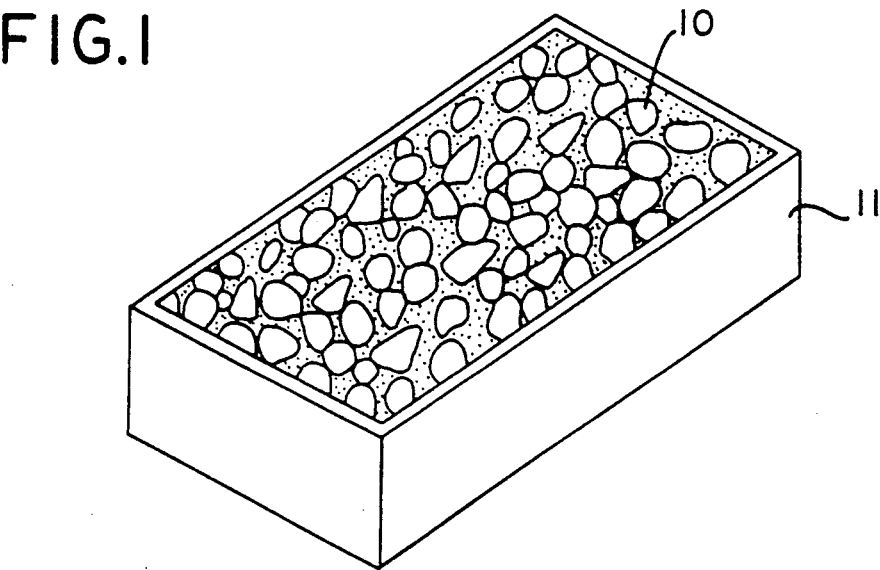
FIG. 1 is an explanative drawing shown a manufacturing condition of an example in the present invention.
Figure 2:
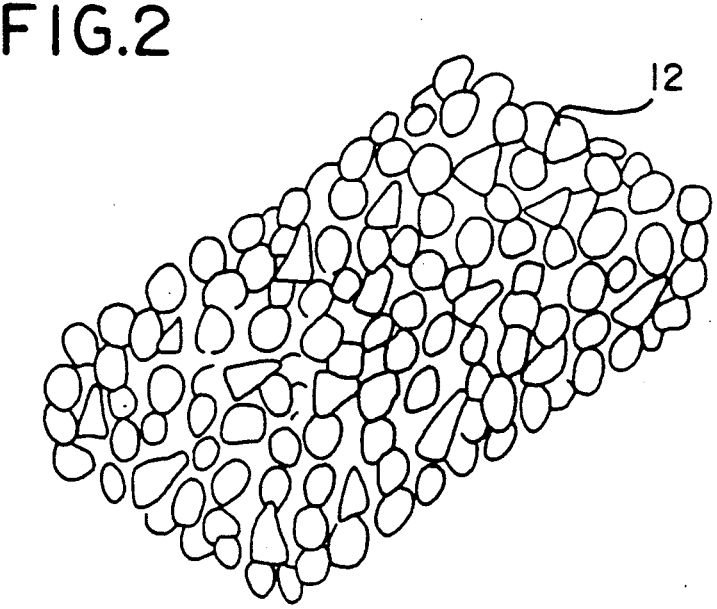
FIG. 2 is a perspective view of the molded food which is manufactured in the above process.

100 parts by weight (pbw) of dried cabbage, 10 pbw of dried corn, 5 pbw of dried wakame (seaweed) and 10 pbw of dried carrot are mixed, and then 10 pbw of water is added to this mixture and mixed sufficiently. Then, 15 pbw of 85 vol % ethyl alcohol solution is added to 30 pbw of kambaiko and mixed. The kambaiko containing the aqueous ethyl alcohol is sprinkled onto said mixture (in a wet condition by adding water) as shown in FIG. 1, said mixture (10) is filled in a molding machine (11), and is compression-molded. Then this is dried by hot air in a mold (11) (90° C., 15 min.), and then is removed from the mold to give molded food (12) shown in FIG. 2.

Thus obtained molded food can be eaten as it is, but it is usually used as ingredients in instant soup and noodle. And by adding powdery soup to the mixture of said dried cabbage, dried corn, dried wakame and dried carrot, molded food which becomes a instant soup with ingredients in can be obtained.

EXAMPLE 2

30 pbw of dried fish (sardine, flat fish and the like) 200 pbw of crisp, 50 pbw of almond, 1 pbw of powdery vitamine (A, B, C, D and the like) and 10 pbw of dried wakame are mixed, and 35 pbw of powdery corn syrup is added to the mixture and mixed further. Then, 15 pbw of 85 vol % ethyl alcohol solution is added to 30 pbw of kambaiko mixed. The kambaiko containing aqueous ethyl alcohol is sprinkled onto the said mixture and mixed sufficiently, the mixture is filled in a molding machine, dried by hot air (90° C., 15 min.) and then removed from the mold.

Thus, the molded food which has the effect same as enrichiment is manufactured. This molded food has good taste and is soft and pleasant to the tongue when eating as it is.

EXAMPLE 3

30 pbw of water is added to 300 pbw of popcorn and mixed. Kambaiko containing water is prepared by adding 15 pbw of 85 vol % ethyl alcohol to 30 pbw of kambaiko. Next, the kambaiko is sprinkled onto said mixture, mixed and then the mixture is filled into a mold and dried by hot air at 90° C. (15 min.) and removed from the mold.

Thereby, the molded food which is binded popcorn with a binder is obtained. This molded food retains the taste of popcorn as it is and has a good taste. Taste of the binder and roughness to the tongue by the binder are not felt at all.

When puffed rice or Chinese noodle chips added some taste instead of popcorn is used, the same molded food as said popcorn binded with the binder is obtained.

EXAMPLE 4

100 parts by weight (pbw) of wheat flakes, 10 pbw of dried corn, 5 pbw of dried wakame (seaweed) and 10 pbw of dried carrot are mixed, and then to this mixture 10 pbw of the powdery sugar (soft sugar) is added and mixed. Next, 10 pbw of water is added to this mixture and mixed. Then, 15 pbw of 85 vol % ethyl alcohol solution is added to 30 pbw of kambaiko and. The kambaiko containing the aqueous ethyl alcohol is sprinkled onto the above mixture (wet condition by adding the water), as shown in FIG. 1, the mixture (10) is filled in a molding machine (11), and is compression-molded. Next, this is dried by hot air in a mold (90° C., 15 min.), and then is removed from the mold to manufacture a molded food shown in FIG. 2. This molded food has no lump of kambaiko and it looks well and the taste thereof is good. The taste obtained in the condition that the binder is dissolved and flakes are separated each other by adding the milk to the molded food is also good.

EXAMPLE 5

30 pbw of dried small fish (sardine, flatfish and the like), 200 pbw of crisp, 50 pbw almond, 1 pbw of vitamine powder (A, B, C, D etc.) and 10 pbw of dried wakame are mixed, and 30 pbw of powdered corn syrup is added and mixed. Next, 20 pbw of water is added to this mixture and mixed. Kambiako containing aqueous ethyl alcohol is prepared by adding 15 pbw of 85 vol % ethyl alcohol to 30 pbw of kambaiko. This kambaiko is sprinkled onto the above mixture and well mixed, and then the mixture is filled into a mold and dried by hot air at 90° C., (15 min.) in that state, and removed. Thus the molded food which has the effect same as enrichment is manufactured. This molded food has good taste and is soft and pleasant to the tongue without any lumps of kambaiko.

EXAMPLE 6

50 pbw of powdered granular sugar is added to 300 pbw of popcorn and mixed, further 30 pbw of water is added thereto and mixted. Kambaiko containing water is prepared by adding 15 pbw of 85 vol % ethyl alcohol to 30 pbw of kambaiko. This kambaiko is sprindled onto the above mixture and mixed, and then the mixture is filled into the mold and dried by hot air at 90° C. (15 min.) in that state, and removed from the mold.

Thereby, the molded food which is binded popcorn with a binder, kambaiko is obtained. This molded food has no lump of kambaiko and the taste of popcorn used therein remains to make the molded food with a good taste. And as well as the molded food shown in Example 5, taste of the binder and roughness to the tongue by the binder are not felt at all.

If puffed rice or Chinese noodle chips added some taste instead of popcorn is used, the same molded food which is binded popcorn with the binder is obtained.

EXAMPLE 7

300 pbw of crisp, 50 pbw of almond nuts, 20 pbw of peanuts are mixed and further 35 pbw of powdered sugar (soft sugar) is mixed. Next, 50 pbw of water is added to this mixture and mixed well to make it wet. After this, the same process as in Example 4 are conducted and the same molded food is manufactured. In this molded food, no lump of kambaiko is found, and the taste of almond remains enough and the taste is soft and pleasant to the tongue.

We claim:

1. A process for producing a molded food which comprises:

wetting particles of a granular or chipped processed food with water;

sprinkling the surface of the wet particles with 5-20 parts, per 100 parts by weight of the processed food, of a pregelatinized cereal powder containing aqueous ethyl alcohol, whereby the cereal powder adheres to the surfaces of the wet particles; and molding and drying the particles having powdered pregelatinized cereal powder on their surfaces.

2. A process for producing a molded food according to claim 1, wherein the granular or chipped processed food is selected from the group consisting of instant noodle chips, nuts, dried processed vegetables, dried processed fruits, dried processed meat, dried processed fish and confections.

3. A process for producing a molded food according to claim 1, wherein the pregelatinized cereal is selected from the group consisting of glutinous rice powder, nonglutinous rice powder, waxy corn starch, potato starch, wheat starch, corn starch and tapioca starch.

4. A process for producing a molded food according to claim 1, wherein the drying is by means of hot air or a microwave oven.

5. A process according to claim 1, wherein a saccharide is adhered to the granular or chipped processed food prior to adding water to wet the processed food.

* * * * *